United States Patent [19]

Ehret et al.

[11] Patent Number: 5,702,826
[45] Date of Patent: Dec. 30, 1997

[54] LAMINATED NONWOVEN WEBS DERIVED FROM POLYMERS OF LACTIC ACID AND PROCESS FOR PRODUCING

[75] Inventors: Philippe Ehret, Fortschwihr; Philippe Guipouy, Guebwiller; Kimmo Lahtenkorva, Kaysersberg, all of France

[73] Assignee: Fiberweb France, Biesheim, France

[21] Appl. No.: 542,169

[22] Filed: Oct. 12, 1995

[30] Foreign Application Priority Data

Oct. 12, 1994 [FR] France .................................. 94 12333

[51] Int. Cl.⁶ .......................... B32B 23/08; B32B 27/00
[52] U.S. Cl. ...................... 428/515; 442/329; 442/383; 442/384; 442/392; 442/395; 442/401; 442/402; 442/408
[58] Field of Search .................... 428/286, 515, 428/287; 442/329, 383, 384, 392, 395, 401, 402, 408

[56] References Cited

U.S. PATENT DOCUMENTS

| 4,743,257 | 5/1988 | Tormala et al. | 623/16 |
| 5,097,005 | 3/1992 | Tietz | 528/272 |
| 5,216,050 | 6/1993 | Sinclair | 524/108 |
| 5,359,026 | 10/1994 | Gruber | 528/354 |
| 5,472,518 | 12/1995 | Patnode et al. | 134/34 |

*Primary Examiner*—Helen Lee
*Attorney, Agent, or Firm*—Weiser & Associates, P.C.

[57] ABSTRACT

The present invention relates to a composite structure comprising one or more plies of nonwoven and one or more plies of film, these being manufactured from thermoplastics, wherein all the plies making up the structure, for example (12, 13, 14), are totally manufactured from a member of the group: a polymer derived from lactic acid, a copolymer of lactic acid, a blend of polymers derived from lactic acid.

The invention also relates to a process for obtaining said composite structure.

13 Claims, 1 Drawing Sheet

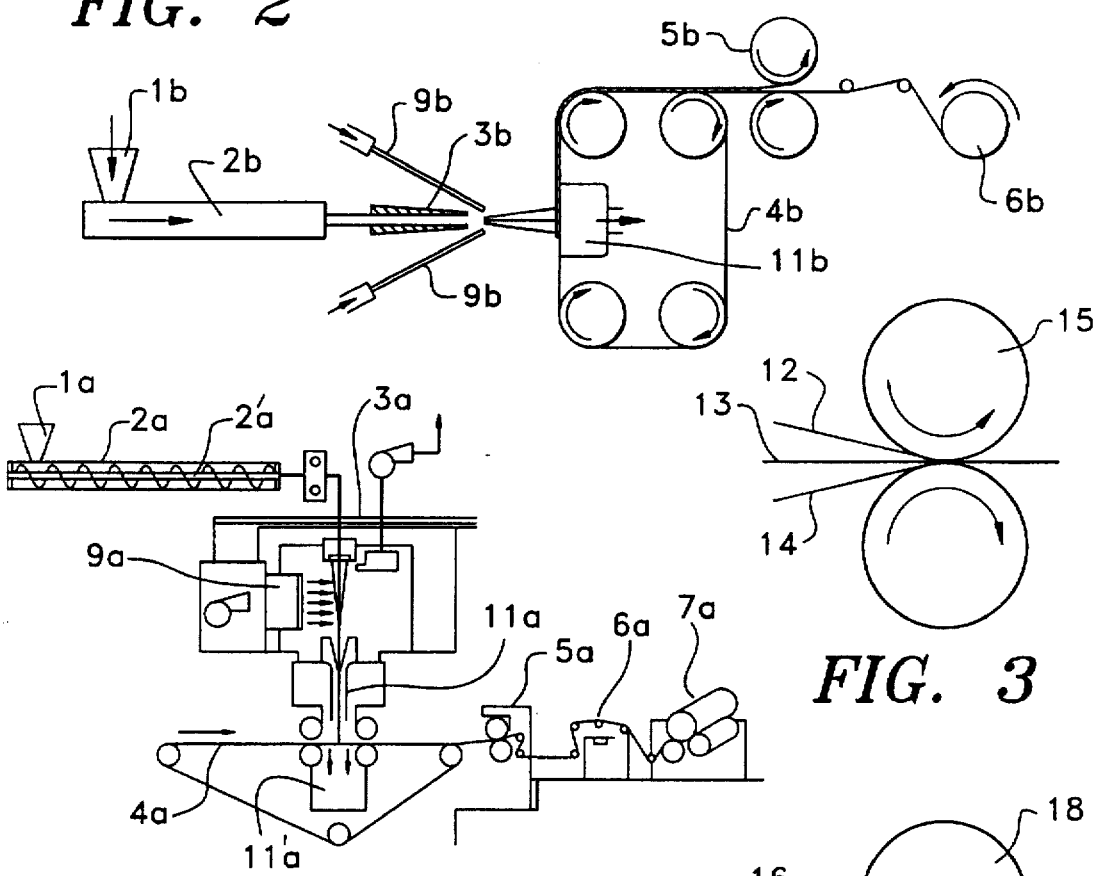
FIG. 2
FIG. 1
FIG. 3
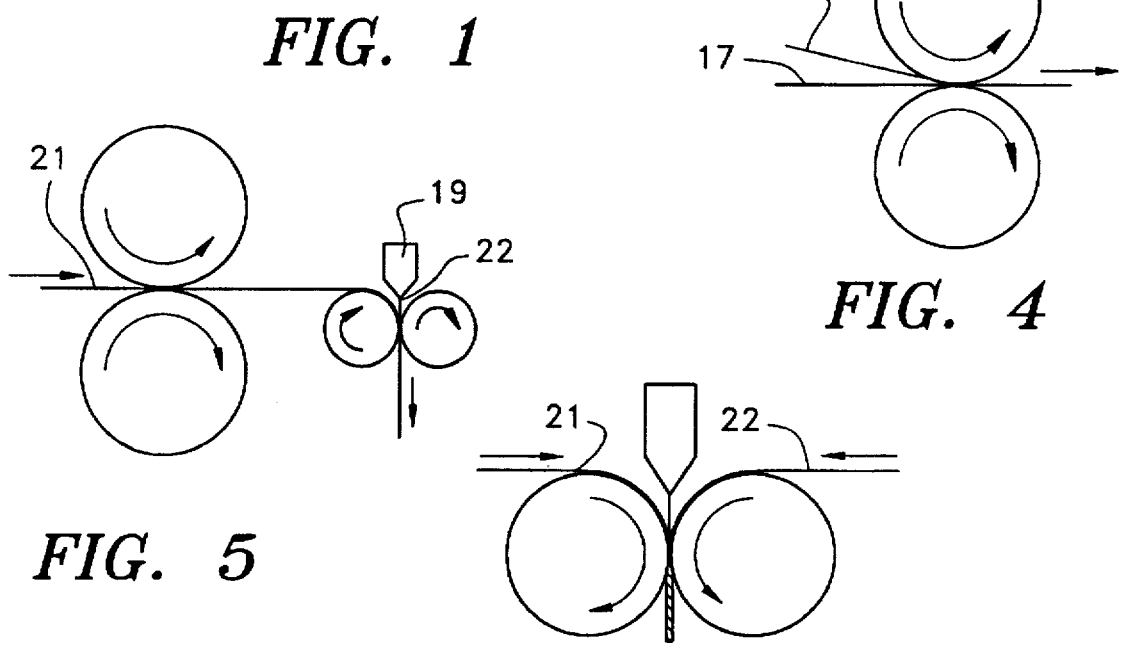
FIG. 4
FIG. 5
FIG. 6

LAMINATED NONWOVEN WEBS DERIVED FROM POLYMERS OF LACTIC ACID AND PROCESS FOR PRODUCING

The present invention relates to a composite structure comprising one or more films, or one or more plies of nonwoven combined together.

This invention also relates to the process for manufacturing said composite structure and the method for combining the various plies of this composite.

Conventionally, said composite products are composed of polyolefins. The applications in which this type of composition is used are: diapers, sanitary napkins, protective clothing, surgical masks and drapes in the medical field and certain products for absorption and filtration, protection of plants in agriculture and mulching.

These products, which are used only once and are disposable, are manufactured with polymers which are often stable materials that do not degrade naturally.

The amount of waste continues to grow throughout the planet and the environment is becoming increasingly polluted. Spent products, such as films, nonwovens for hygiene (diapers, sanitary napkins, etc.), for medical applications (gowns, surgical drapes, etc.), and for agriculture (frost protection, mulching, etc.) constitute a large part of the solid waste.

The use of degradable polymers, in particular those which are biodegradable, constitute one of the solutions to this problem.

These are mainly polymers derived from lactic acid (PLA), (Boehringer Ingelheim: RESOMER), form polycaprolactone (PCL), (Union Carbide: TONE, Interox Chemicals: CAPA), polyhydryoxybutyrate/valerate copolymers (PHB/V), (Zeneca Bio Products: BIOPOL), polyglycolic acid (PGA). Several patents or patent applications exist in this filed. For example: European Patent Application No. 93303000.9, "Biodegradable disposable diaper" of the inventors SHOWA DENKO K. K. relating to a totally biodegradable diaper whose degradable polyester nonwoven is used as a surface web permeable to liquids and as a leakproof barrier.

Application PCT/US 92/00229, "Novel polyesters and their use in compostable products such as disposable diapers", filed by E. I. DU PONT DE NEMOURS AND COMPANY, relates to several types of disposable products comprising fibers, films, foams, etc. based on novel biodegradable polyesters.

These polymers are well known today in the medical field. They have been used as a raw material for sutures; reference may be made, for example, to: D. E. Cutright et al. in his treatise "Mistologic comparison of polylactic and polyglycolic acid sutures", Oral Surg. 32, 165–173, 1971, for various types of implants (screws, rods, plates); "polylactic acid for surgical implants" published in 1966 by R. K. Kulkarni et al., Arch Surg., 93, 839–843; Eds et al describes several systems for the controlled diffusion of an active principle in "Biodegradable polymers as drug delivery systems: manufacturing methodology, release control and targeting prospects", J. Bioactive Compatible Polymers 1990, 5, 315–342; as well as the Finnish company BIOSCIENCE LIMITED which manufactures screws, nails, rods and plates (BIOFIX), intended to consolidate bone fractures, based on polymers derived from lactic acid and from polyglycolic acid.

Polymers derived from lactic acid (PLA) seem to be the most promising for replacing the stable polymers used hitherto in the composition of films and nonwovens. PLAs offer the possibility of obtaining mechanical and physicochemical properties which are comparable to those of conventional polymers (U.S. Pat. Nos. 4,743,257 in 1988 and 4,968,317 in 1990). Unlike other biodegradable polymers, it is very easy to manufacture, at relatively low cost, fine fibers from polymers derived from PLA (Ahmad Y. A. Khan et al., "Melt processing of poly(lactide) resin into nonwovens", TANDEC, University of Tennessee, and French Patent Application 9309649, Aug. 2, 1993 and European Patent Application 944700186 "Nonwoven based on polymers derived from lactic acid, manufacturing process and use of such a nonwoven", FIBERWEB SODOCA).

A few patents also exist relating to composites. For example, MITSUI TOATSU CHEMICALS INC. applied for a patent on May 12, 1992, No. 92/304269.1, entitled "Degradable lamination composition". This patent relates to polymers derived from PLA (including copolymers of PLA and hydroxycarboxylic acid), these being used for laminating with paper in the field of the packaging industry.

In addition to their biodegradable property, polymers derived from PLA are manufactured from renewable materials such as beet sugar or whey. Thus, the manufacture of these polymers does son disturb at all the natural balance (greenhouse effect) and does not use oil or nonrenewable energy.

The present invention relates to a composite structure based on polymers derived from PLA. This composite structure is composed of plies of nonwovens and/or of films. Each ply possesses mechanical, barrier-effect, absorption, filtration and thermal-insulation properties which can be adapted to each application by selecting the suitable composition of the nonwovens and of the films based on polylactic acid.

A "spun-bonded" nonwoven, designated in the rest of the text by the abbreviation SB, is customarily used as a support. Furthermore, in this configuration, a film, intended to provide impermeability and a barrier effect, and/or another SB or melt-blown (designated by MB in the rest of the text) ply, in order to provide filtration/absorption and thermal-insulation properties, are added.

More particularly, the invention consists of a composite structure comprising one or more plies of nonwoven and one or more plies of film, these being manufactured from thermoplastics, wherein all the plies making up the structure are totally manufactured from one of the members of the group: a polymer, a copolymer, a blend of polymers, all derived from lactic acid.

Depending to the application, a derivative of lactic acid chosen form the group: D-lactic acid of L-lactic acid, or a derivative of DL-lactic acid, or a blend of L-lactic acid and of D-lactic acid is used.

Preferably, the polymer, the copolymer or the blend of polymers has an average molecular weight of between 10,000 and 1,000,000.

Also preferably, all the plies of nonwoven of the structure according to the invention are produced by a process chosen from the group: hot calendering, needle punching, water-jet bonding, chemical bonding, over-blowing, film extrusion.

Depending on the manufacturing process, the type of bonding or the type of polymer used, the plies of nonwoven and film which make up a structure according to the invention have particular individual properties.

The invention will be better understood with the aid of the following description given with reference to the following appended figures:

FIG. 1: a diagram showing a spin-bonding process for manufacturing a web of nonwoven;

FIG. 2: a diagram showing a melt-blowing process for manufacturing a web of nonwoven;

FIG. 3: a diagram showing the construction of a three-ply laminated nonwoven according to the invention for medical application;

FIG. 4: a diagram showing the construction of a laminated composite structure according to the invention for hygiene application;

FIGS. 5 and 6: diagrams showing two processes for obtaining a composite structure according to the invention for agriculture.

Said invention relates to a multiply composite structure using a polymer or polymers based on PLA. These are composed of pure poly(L-lactide) (PLLA), pure poly(D-lactide) (PDLA), copolymers of poly(DL-lactide) whose ratio varies from 0% to 100%, as well as blends of the polymers mentioned.

The average molecular weight of the polymer may vary from 10,000 to 1,000,000 or preferably, 40,000 to 600,000. As significant degradation occurs during melting, the molecular weight must not be less than this. A greater molecular weight could lead to a higher viscosity during melting.

The raw material (polymer(s) derived from PLA) used in this invention could contain a plasticizer in proportions of from 0.1 to 15% and/or from 0.1 to 20% of lactic monomer and/or from 0.01 to 5% of various types of stabilizers, pigments and other colorants.

Each ply of said multiply composite product could be produced using various compositions of raw materials based on PLA and various additives.

Said composite is composed of at least on ply. Each of these plies is either a we of nonwoven of a film, so that the composite includes at least one nonwoven. Each ply is intended for a specific use. In the case of a surgical drape for example, said composite includes a ply of nonwoven having absorption and comfort properties, and a ply of film having a barrier (Viral barrier) effect. Said compositions, particularly MB and SB compositions, may also be used in sanitary napkins (U.S. Pat. No. 4,578,069 of 1986 using a composite based on polyolefins) or sterilization wraps (U.S. Pat. No. 4,766,029 of 1988 using an SB+MB+SB three-ply laminate).

In the present invention, the web of nonwoven is a material similar to a woven fabric, but manufactured without weaving or knitting, having a structure of oriented fibers. The fibers may either be continuous of have a length varying from 5 mm to 500 mm. Preferably, the fiber linear density is from 0.05 to 20 dtex.

The web(s) may be bonded or not bonded. Bonding may be performed by needle punching, water jets, chemical bonding or heat bonding.

Various SB-type processes for manufacturing nonwoven webs, such as the Lurgi and S-Tex process, and the B (melt blowing) process, exist.

The manufacture of an SB-type web pertaining to the invention will firstly be described.

The SB web provides the composite structure with good mechanical properties (strength, elongation and pliancy). It may also be used for absorption and filtration. In some applications where it constitutes the surface ply, it provides softness and comfort.

In this process, the polymer is melted and extruded by means of a single-screw or twin-screw extruder, at a temperature preferably lying between 140° and 280° C., and is conveyed to a spinning pump which is normally a gear pump. Host often, a filter and a static mixer are installed before the pumps.

After the pumps, the molten polymer passes through the filter as far as the spinneret which has holes preferably varying from 0.2 to 2.0 mm and particularly from 0.4 to 1.0 mm. The polymer is spun through the spinneret as far as the cooling and drawing installation. The cooling may be performed by means of chilled air, at a temperature varying preferably between 0° and 40° C. and a rate varying from 0.1 to 5 m/s, and the drawing may be performed by suction of air or blown air through the drawing system. The drawing system may have one slit or may be formed by a series of tubes or slits. The speed of the drawing air is preferably between 10 and 400 m/s. In the drawing system, the fibers obtained have a decreasing diameter and an oriented structure. The draw ration is generally from 1.1× to 20×, preferably from 2× to 15×. In the SB ply, the linear density of the fibers is preferably between 0.5 and 20 dtex, more particularly from 1 to 10 dtex.

The spinning system is followed by a laydown system which lays the fibers down randomly on the belt. The belt conveys the web of fibers to a calender heated to a temperature varying preferably from 40° to 160° C., more particularly from 60° to 110° C. Before calendering, the other webs are juxtaposed in order to form the composite, for example another SB web, an MB web or both of them, and/or a ply of film.

It will be possible to adjust the basis weight by varying the speed. It is generally between 5 to 200 g/m² depending on the application.

the diagram in FIG. 1 is a representation of an SB (i.e. S-Tex) process: (1a) hopper for raw material, (2a) extruder, (2'a) screw, (3a) spinneret, (4a) belt, (5a) calender, (6a) system for guiding the web and for adjusting the wind-up tension, (7a) winding, (9a) system for cooling the fibers, (11a) drawing slit, (11'a) section for the drawing.

The MB web of said composite structure is intended to provide properties such as absorption, filtration and/or thermal insulation, softness and comfort. It also allows the permeability of the composite to be adapted. The MB process also comprises an extruder intended to melt the polymer. The temperatures are preferably between 150° and 280° C. The polymer is conveyed from the extruder to the spinneret. The spinneret has only a single row of holes. The holes have a diameter of from 0.2 to 2 mm.

Blown air generated on either side of the row of holes sprays the polymer in fiber form onto the moving web. The fiber linear density is from 0.05 to 2 dtex. The basis weight of the MB web is adjusted as a function of the speed of the belt.

The manufacture of an MB web which can be used in the invention is now described.

The MB web may be deposited directly on the SB web. This process is called over-blowing. In this process, the SB system is installed before the MB system, both being installed before the calender. The calender heat-bonds the two webs.

The diagram in FIG. 2 represents the MB process: (1b) hopper for raw material, (2b) extruder, (3b) spinneret, (4b) forming belt, (5b) calender, (6b) winder, (9b) blowing, (11b) suction.

The ply of film of said composite structure is intended to provide properties such as liquid barriers and good drapability. However, the film may be porous (U.S. Pat. No. 5,208,098 of 1993) and, in this case, it is permeable and absorbent.

Finally, the manufacture of a film pertaining to the invention is described.

The film is deposited on the composite structure by extrusion. The temperature of the extruder is form 150° to 280° C. and the slot of the die from 0.2 to 2 mm. The ply of film may be extruded separately and bonded to the composite by calendering, it being possible to combine with it only a single nonwoven structure calendered beforehand, or the extruded film may be used to bond separate nonwoven plies. The thickness of the film or films of said composite structure is preferably from 0.001 to 1.0 mm.

Several ways of manufacturing said composite structure according to the invention exist, for example:

1. The nonwoven is bonded thermally (for example by calendering or laminating), by needle punching, water jets, over-blowing (MB) or chemical bonding (FIG. 3: 1. 3 nonwovens, 4. bonding unit).
2. The nonwoven bonded by heat bonding, needle punching, water jets, over-blowing (MB) or chemical bonding agent is combined with the film(s) by lamination or by calendering (FIG. 4: 1. nonwoven, 2. film, 3. bonding unit).
3. The nonwoven bonded by thermal bonding, needle punching, or water jets, or over-blowing (MB) or chemical bonding agent is combined with the film(s) by extrusion-coating (FIG. 5: 1. bonded nonwoven, 2. extrusion die, 3. film).

Described below, by way of nonlimiting examples, are three nonwoven structures in accordance with the invention.

EXAMPLE 1

Three-ply nonwoven for medical application (See FIG. 3)

This composite structure is totally based on PLAs (specifically PLLA), and manufactured on a production line by means of three different slots: firstly, an installation (SB) delivering a web (12), secondly and MB installation delivering a web (13) and lastly another SB installation delivering a web (14). These installations follow in sequence and a calender (15) bonds the various webs together.

The first SB web (12) has a basis weight of 10–20 g/m$^2$ and the fibers have a linear density of from 1.5 to 2.5 dtex. The MB web (13) has a weight of from 5.0 to 15 g/m$^2$ and a linear density of from 0.1 to 0.3 dtex. The weight of the second, SB, web (14) is between 10 and 20 g/m$^2$ and the fibers have a linear density of from 1.5 to 3.0 dtex. Thus, the total weight is from 25 to 55 g/m$^2$. The bonded surface area is of the order of from 8 to 15% and the calendering temperature is between 65° C. and 120 ° C., depending on the type of raw material, the additives and the speed used. The strength of this composite is between 40 and 100 N/5 cm and the elongation at break is from 30 to 60%.

The SB webs (12, 14) of said composite structure improve the strength and the elongation, as well as the comfort and the absorbent properties. Certain additives may be used to obtain hydrophilic or hydrophobic SB webs.

The MB web (13) is intended to provide the liquid-barrier property but it does not have, however, a gas-barrier effect (aerated structure). The MB web placed between the SB webs increases the pliancy and the comfort of said composite structure.

This three-ply laminate may find applications in protective clothing (hydrophilic inner face and hydrophobic outer face) in operating units (surgical gowns and drapes).

For use in the medical field, this composite structure will have to have properties of being resistant to the irradiation used in sterilizing. The polymer derived from PLA may be stabilized against gamma and beta rays (the normal doses used in a medical environment being 25 or 50 kGy) by adding certain stabilizers. The reduction in the mechanical properties after sterilization will be less than 15% by using stabilizers.

EXAMPLE 2

Laminated composite structure for hygiene application (see FIG. 4)

This composite structure is totally based on PLAs (specifically PLLA having an average molecular weight of from 30,000 to 150,000 with Adpack stabilizing the temperature) and is composed of two plies (16, 17), an SB web and an MB web.

The webs are bonded by calendering with a bonding area of from 9 to 15%. The temperature of the calender (18) should be slightly lower on the MB face (approximately 10° to 20° less).

The SB web has a weight of from 15 to 25 g/m$^2$ and the MB web from 5 to 10 g/m$^2$. The total weight will be from 20 to 35 g/m$^2$, the strength from 25 to 50 N/m$^2$ and the elongation at break of from 30 to 50%.

Said composite structure is adapted to this application. The SB web provides satisfactory mechanical properties and serves as the support; the MB web has a liquid-barrier effect but it may be vapor permeable.

EXAMPLE 3

Composite Structure for Agriculture (See FIGS. 5 and 6)

The composite structure based on PLA, intended for use in agriculture comprises and SB web (21) and a ply of film (22). The structure may be manufactured by the extrusion-coating (19) of a ply of film (22) on the SB web (FIG. 5) or by laminating these two plies (21, 22) by heat bonding (FIG. 5). A black colorant (carbon black, 0.5–1.5% by weight) is used for both plies so as to obtain an opaque structure suitable for mulching (U.S. Pat. No. 3,580,196 of 1971, using a nondegradable plastic sheet).

In the application for mulching, the SB web provides the strength and the film provides impermeability. In addition, whom the SB ply forms the outer face, this dries more rapidly after rain, something which enables strawberries to be kept in a good condition for example. Moreover, the impermeable film prevents the soil from drying out. The black color forms a sun barrier and prevents weeds from growing. In short, in this case, biodegradability offers the following advantages: the mulching product may be left in place and will degrade with time (a function which can vary from 2 to 36 months), and it may also be removed and buried, or intended for composting with degradation over several weeks.

Said composite structure preferably has a weight of from 15 to 75 g/m$^2$ and a film thickness of from 0.01 to 0.10 mm, depending on the specifications in terms of properties and lifetime. For example, the mulching product containing 1% by weight of carbon black, having a weight of 50 g/m$^2$ for the SB web and a film thickness of 0.025 mm, has the following properties:

Elongation at break: 40 to 60%;

MD strength: 110 to 160 N/m$^2$.

The lifetime may be varied by using a UV stabilizer.

Preferably, a structure according to the invention has the following characteristics:

the polymer, or copolymer or blend of polymers, derived from lactic acid, has an average molecular weight of between 10,000 and 1,000,000;

the linear densities of the filaments used in each ply of nonwoven making up the structure are between 0.05 and 20 dtex;

the thickness of each film of the structure is between 0.001 and 1 mm;

all the plies of nonwoven making up the structure are manufactured according to a process chosen from the group: SB, dry route, wet route, MB;

all the nonwoven and film plies making up said structure are bonded to one another in a continuous line or separately.

We claim:

1. A composite structure comprising a ply of a nonwoven and one or more plies selected from the group consisting of nonwoven and film, wherein the plies consist of thermoplastic polymers derived only from lactic acid.

2. The composite structure of claim 1, wherein the lactic acid is chosen from the group: D-lactic acid, L-lactic acid.

3. The composite structure of claim 1, wherein the lactic acid is a DL-lactic acid.

4. The composite structure of claim 1, wherein the lactic acid is a mixture of L-lactic acid and D-lactic acid.

5. The composite structure of claim 1, wherein the linear densities of the filaments used in each ply of nonwoven making up the structure are between 0.05 and 20 dtex.

6. The composite structure of claim 1, wherein the thickness of each film in the structure is between 0.001 and 1 mm.

7. The composite structure of claim 1, wherein all the plies of nonwoven making up the structure are manufactured according to a process chosen from the group consisting of spunbonding, dry route, wet route, meltblowing.

8. The composite structure of claim 1 wherein the plies of nonwoven are bonded by a process selected from the group consisting of hot calendaring, needle punching, water-jet bonding, chemical bonding, over-blowing, and film extrusion.

9. The composite structure of claim 1 which comprises a ply of a spunbond nonwoven.

10. The composite structure of claim 9 which further comprises a ply of a meltblown nonwoven.

11. The composite structure of claim 10 which further comprises a second ply of a spunbond nonwoven and the meltblown nonwoven is sandwiched between the two spunbond plies.

12. The composite structure of claim 9 which further comprises a ply of a film.

13. The composite structure of claim 1 wherein each nonwoven ply has a basis weight between 5 and 200 g/m$^2$.

* * * * *